(12) United States Patent
Zakhem et al.

(10) Patent No.: US 9,352,687 B1
(45) Date of Patent: May 31, 2016

(54) METHODS AND SYSTEM FOR VEHICLE SETTING CONTROL

(71) Applicant: General Motors, LLC, Detroit, MI (US)

(72) Inventors: Samer Zakhem, Troy, MI (US); Brandon Anderson, Clarendon Hills, IL (US)

(73) Assignee: General Motors LLC, Detroit, MI (US)

( * ) Notice: Subject to any disclaimer, the term of this patent is extended or adjusted under 35 U.S.C. 154(b) by 27 days.

(21) Appl. No.: 14/536,197

(22) Filed: Nov. 7, 2014

(51) Int. Cl.
  *B60Q 1/14* (2006.01)
  *B60Q 3/04* (2006.01)
  *B60Q 3/00* (2006.01)
  *B60Q 3/02* (2006.01)

(52) U.S. Cl.
  CPC .. *B60Q 3/04* (2013.01); *B60Q 3/00* (2013.01); *B60Q 3/02* (2013.01)

(58) Field of Classification Search
  None
  See application file for complete search history.

(56) References Cited

U.S. PATENT DOCUMENTS

2015/0234470 A1\* 8/2015 Rosenstock et al. ............ 315/77

FOREIGN PATENT DOCUMENTS

WO   WO2013/038293   3/2013

\* cited by examiner

*Primary Examiner* — Anh Tran
(74) *Attorney, Agent, or Firm* — Dierker & Kavanaugh, P.C.

(57) ABSTRACT

An input to increase or decrease a system setting in a vehicle interior is received, and the setting is adjusted. In one example, an in-vehicle ambient light color is controlled during the adjusting so an ambient light changes from a primary color setting to a first feedback color during setting increase and to a second feedback color during setting decrease; and the ambient light color is returned to the primary color setting at a time after completing the adjusting. In another example, the ambient light color is controlled during the adjusting so the ambient light transitions from a then-current color setting towards a first feedback color during setting increase and towards a second feedback color during setting decrease; and upon reaching an increased or decreased setting value, the ambient light remains at a new then-current color until another setting input is received or until the ambient light is turned off.

20 Claims, 2 Drawing Sheets

METHODS AND SYSTEM FOR VEHICLE SETTING CONTROL

TECHNICAL FIELD

The present disclosure relates generally to methods and a system for vehicle setting control.

BACKGROUND

Vehicles are often equipped with in-vehicle communications platforms (e.g., telematics unit and/or infotainment units) or other in-vehicle controllers that enable hands free calling, vehicle tracking, navigation instruction transmission, application downloads, and other like features. In-vehicle communications platforms or other in-vehicle controllers may also be configured to activate vehicle settings that are personal to the vehicle user. A user may select desirable settings and configure the in-vehicle communications platforms or other in-vehicle controller from within the vehicle.

SUMMARY

In an example of a method for vehicle setting control, an input to increase or decrease a setting of a system in a vehicle interior is received. The setting is adjusted in response to the input. In this example, an in-vehicle ambient light color is controlled during the adjusting such that an ambient light changes from a primary color setting to a first feedback color during an increase of the setting and to a second feedback color during a decrease of the setting. The in-vehicle ambient light color is returned to the primary color setting at a time after completing the adjusting.

In another example of the method for vehicle setting control, an input to increase or decrease a setting of a system in a vehicle interior is received. The setting is adjusted in response to the input. In this example, the in-vehicle ambient light color is controlled during the adjusting such that the ambient light transitions from a then-current color setting towards a first feedback color during an increase of the setting and towards a second feedback color during a decrease of the setting. Upon reaching an increased setting value or a decreased setting value, the ambient light remains at a new then-current color until another input to increase or decrease the setting of the system is received or until the ambient light is turned off.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the method disclosed herein may be used to provide visual feedback to a user in response to a requested change in a vehicle setting. When the user requests an increase or a decrease in a particular vehicle setting, the in-vehicle systems work together to not only increase or decrease the vehicle setting in accordance with the request, but also to alter the in-vehicle ambient light color to inform the user that the increase or decrease is taking place. The change in the in-vehicle ambient light color passively makes the driver or other vehicle passenger(s) aware of the setting change. In some instances, the in-vehicle ambient light color is transitioned in a manner that apprises the driver or other vehicle passenger(s) of both the direction and the degree of the setting change that is made.

The in-vehicle ambient light color, as referred to herein, is the hue or shade of the environment within the vehicle as provided by an in-vehicle ambient light. The in-vehicle ambient light may be any interior vehicle light source (e.g., bulb, light emitting diode (LED), etc.) that is dedicated to lighting up the interior of the vehicle and is capable of changing the color of the lighting. As examples, the ambient light may be an in-vehicle light strip (e.g., positioned on any of the dashboard, console, floor, etc.), an overhead interior light, a dashboard light, a floor light, a console light, and combinations thereof. The ambient lights may include several lights integrated across the vehicle interior that together illuminate the vehicle interior. In the examples disclosed herein, it is to be understood that the ambient light is not alone a display graphic or a light of an-vehicle system (e.g., a backlight of a system control input, a backlight of the instrument panel, an alarm light, or another like system light). In some examples, the graphic display or light of the in-vehicle system may alter its color to coincide with the ambient light changes. The ambient light either includes differently colored bulbs or a red green blue (RGB) LED that is capable of changing to a desirable color in order to indicate a shift or change in an in-vehicle setting.

Also as used herein, the terms "connect/connected/connection" and/or the like are broadly defined herein to encompass a variety of divergent connected arrangements and assembly techniques. These arrangements and techniques include, but are not limited to (1) the direct connection between one component and another component with no intervening components therebetween; and (2) the connection of one component and another component with one or more components therebetween, provided that the one component being "connected to" the other component is somehow in operative communication with the other component (notwithstanding the presence of one or more additional components therebetween).

Figure 1:
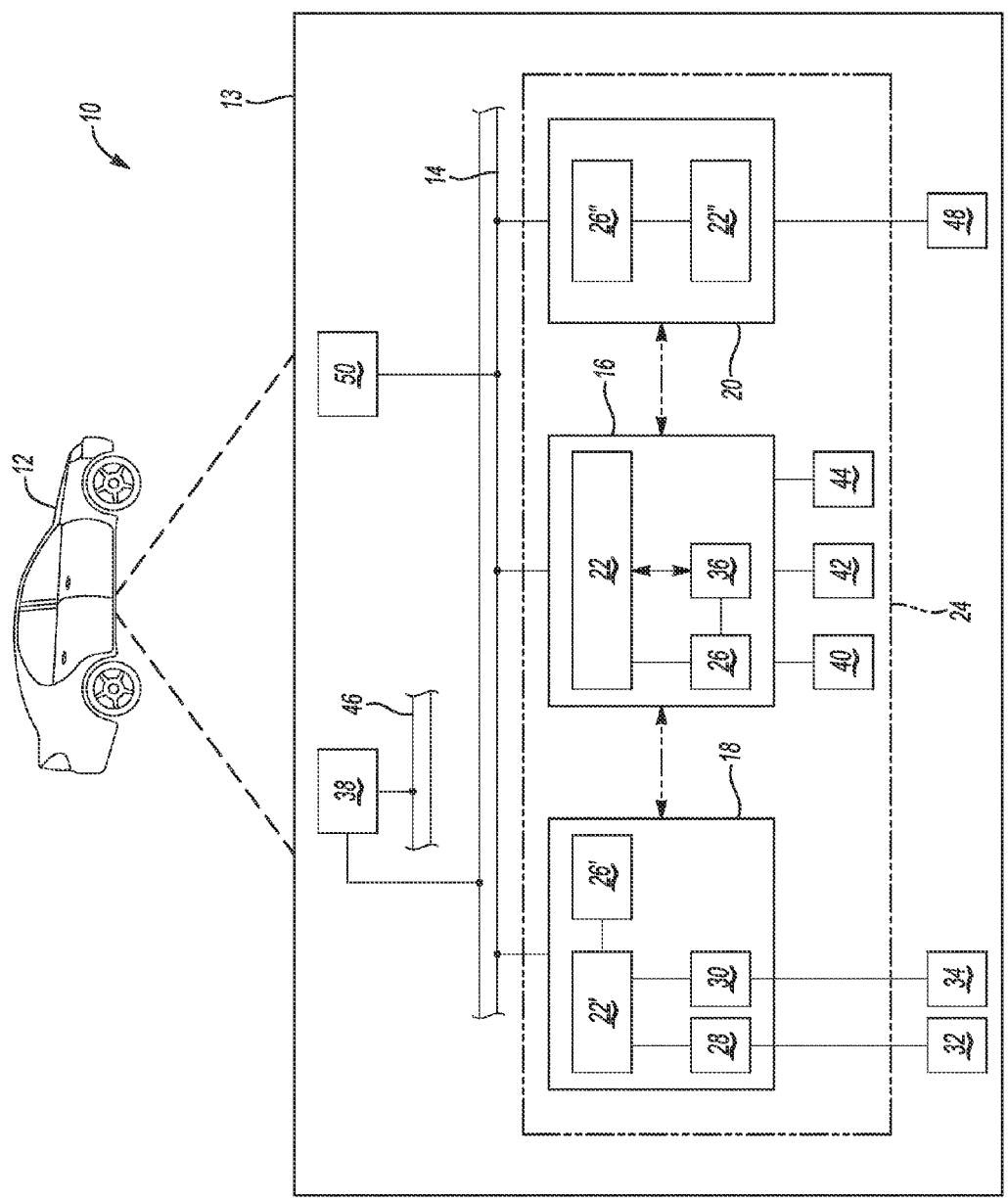
FIG. 1 is an example of a system for controlling a vehicle setting.

Referring now to FIG. 1, an example of the system 10 for controlling a vehicle setting is shown. The system 10 includes a vehicle 12 equipped with various in-vehicle systems 13.

The vehicle 12 may be a car, motorcycle, truck, or recreational vehicle (RV) that is equipped with suitable hardware and computer readable instructions/code that enable it to simultaneously configure in-vehicle setting(s) and provide visual feedback. In some instances, the vehicle 12 may also be equipped with suitable hardware and computer readable instructions/code that enable it to communicate (e.g., transmit and/or receive voice and data communications) over a carrier/communication system (not shown) and/or using short range wireless technology.

The vehicle 12 includes a vehicle bus 14. The vehicle bus 14 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The vehicle bus 14 enables various in-vehicle modules (e.g., a system control module 16, a setting input module 18, an ambient light control module 20) to communicate with one another by sending real-time bus messages, such as setting increase command(s), setting decrease command(s), signals, etc., from one module 16, 18, 20 to another module 16, 18, 20. When the vehicle 12 includes a vehicle communications platform (VCP 50, discussed below), the vehicle bus 14 is also capable of sending messages to and receiving messages from various units of equipment and systems outside the vehicle 12.

As previously mentioned, the vehicle 12 includes the system control module 16, the setting input module 18, and the ambient light control module 20. In one example, each of these modules 16, 18, 20 includes a respective microprocessor 22, 22', 22" that executes computer-readable instructions/code associated with the particular module 16, 18, 20. In another example, the modules 16, 18, 20 are sub-modules of an integrated module 24 that includes a single microprocessor (e.g., microprocessor 22 or a microprocessor of the VCP 50). When included as an integrated module, the single processor executes the computer-readable instructions/code associated with each of the particular sub-module 16, 18, 20.

Whether respective microprocessors 22, 22', 22" or a single processor are utilized, the microprocessor(s) 22, 22', 22" is/are an electronic processing device. The microprocessor 22, 22', 22" is a multipurpose, programmable device that accepts digital data as input, processes it according to computer-readable instructions stored in its electronic memory 26, 26', 26", and provides results as output (e.g., commands, signals, messages, etc.). The microprocessor 22, 22', 22" may be on a single integrated circuit or multiple integrated circuits.

The electronic memory 26, 26', 26" of the microprocessor(s) 22, 22', 22" may be an encrypted memory that is configured to store i) computer readable instructions/code to be executed by the processor(s) 22, 22', 22", ii) data associated with the various systems and/or modules of the vehicle 12 (i.e., vehicle data), iii) vehicle operations, iv) vehicle user preferences and/or personal information, and/or the like. The encrypted memory is a non-transitory, tangible computer readable medium, such as a random access memory (RAM), a read-only memory (ROM), or an erasable programmable read-only memory (EPROM).

The setting input module 18 includes hardware and computer-readable instructions that render the setting input module 18 capable of receiving a user input requesting an increase or a decrease in an in-vehicle setting. In the examples disclosed herein, the in-vehicle setting may be any in-vehicle setting for which there is a range of values. As examples, the in-vehicle setting may be a volume setting, a heating-ventilation-air conditioning (HVAC) setting, a windshield wiper setting, a window setting (where the opening is increased or decreased), or any other in-vehicle setting that can be increased or decreased.

The setting input module 18 may include the microprocessor 22' as well as any user input recognition unit, such as a speech recognition unit 28, a gesture recognition unit 30, or some other unit that recognizes other user inputs, such as a touch screen command, a button press, or a turning knob. As such, the user may request to increase or decrease the desired in-vehicle setting through a speech command, a gesture command, a touch screen command, or by manually moving in-vehicle components, such as buttons or knobs.

When the user input is a speech command, the user may initiate inputting his/her request by some trigger, such as an in-vehicle button press or a touch screen command on an in-vehicle display 34 or any other input that instructs the speech recognition unit 28 to listen for user utterances. In other instances, the speech recognition unit 28 may be programmed to listen for pre-programmed speech commands, and upon hearing this type of command, can ask the user whether he/she wants to initiate the particular in-vehicle setting request. The user then recites an utterance into a microphone 32. The microphone 32 provides the user with a means for inputting verbal or other auditory commands. In the examples disclosed herein, the utterance is a request that some in-vehicle setting be either increased or decreased. For example, the user may say "increase the volume," or "volume up," or "decrease the temperature," or "make it colder," or "put up the driver side front window," or the like. The utterance(s) may be recorded and transferred to the speech recognition unit 28. The speech recognition unit 28, through microprocessor 22', is configured to run computer readable instructions/code (stored on memory 26') for determining what the user is requesting. The speech recognition unit 28 may be programmed to recognize default utterances (that are made known to the user), or the user may program the speech recognition unit 28 to recognize personalized utterances.

Once the user request is identified by the speech recognition unit 28, the setting input module 18 (through microprocessor 22' running computer readable instructions/code) generates a setting increase command or a setting decrease command that is responsive to the user's request. The setting increase or decrease command will identify the vehicle setting that is to be altered, and will also identify whether the setting is to be increased or decreased. As an example, if the speech recognition unit 28 identifies that the user is requesting an increase in the volume, the setting input module 18 will generate a volume increase command. As another example, if the speech recognition unit 28 identifies that the user is requesting that the driver side front window be closed, the setting input module 18 will generate a window opening decrease command.

When the user input is a gesture command, the user may initiate inputting his/her request by some trigger, such as an in-vehicle button press or a touch screen command on the in-vehicle display 34 or any other input that instructs the gesture recognition unit 30 to watch for user gestures. In other instances, the gesture recognition unit 30 may be programmed to watch for user gestures, and to respond accordingly upon recognizing a user gesture. The user performs some gesture in front of a gesture zone (i.e., a platform in the vehicle 12 that is capable of capturing the performed gesture). In an example, the screen of the display 34 and a gesture recognition unit 30 together function as the gesture zone. For example, through the screen, sensors of the gesture recognition unit 30 can recognize a hand gesture performed in front of the screen. Any gesture may be used, including facial gestures. In these instances, the gesture zone may include a camera or sensor (not shown) of the gesture recognition unit 30 positioned to detect an area where the driver's face would be.

In the examples disclosed herein, the gesture is indicative of a request to increase or decrease some in-vehicle setting. The gesture recognition unit 30 may be programmed to recognize default gestures (that are made known to the user), or the user may program the gesture recognition unit 30 to recognize personalized gestures. As mentioned above, the gesture may be a hand gesture, examples of which include thumb's up/down, a finger/hand swipe, holding up a certain number of fingers, pointing the index finger in a certain direction, making a fist, etc., or may be a facial gesture, examples of which include a smile, a wink, etc. For example, the user may gesture a thumb's up sign to request that the temperature be turned up and a thumb's down sign to request that the temperature be turned down. For another example, the user may point his/her index finger to the right (when facing the screen) to request that the volume be turned up and point his/her index finger to the left (when facing the screen) to request that the volume be turned down. As still another example, the user may hold up one finger to request that the windshield wiper speed be turned down and may hold up two fingers to request that the windshield wiper speed be turned up. The gesture recognition unit 30, through microprocessor 22', is configured to run computer readable instructions/code (stored on memory 26') for determining what the user is requesting by interpreting the gesture. In an example, the gesture recognition unit 30 may access a look up table to match the gesture with the requested setting change. In another example, the gesture recognition unit 30 may run a mapping function that maps a gesture to a specific action. The gesture/action mapping may be predefined (e.g., default) or customized by the user.

Once the user request is identified by the gesture recognition unit 30, the setting input module 18 (through microprocessor 22' running computer readable instructions/code) generates the setting increase command or the setting decrease command that is responsive to the user's request. The setting increase or decrease command will identify the vehicle setting that is to be altered and also whether the setting is to be increased or decreased. As an example, if the gesture recognition unit 30 identifies that the user is requesting an increase in the volume, the setting input module 18 will generate a volume increase command.

In other examples, the user may request to increase or decrease the desired in-vehicle setting through a touch screen command. In these instances, vehicle setting icons may be displayed on the display 34, and the user can touch the display to request an increase or a decrease in a particular setting. In these instances, the setting input module 18 recognizes the user request and generates the setting increase command or the setting decrease command that is responsive to the user's request.

In still other examples, the user may request to increase or decrease the desired in-vehicle setting by manually moving in-vehicle components, such as buttons or knobs that are associated with certain settings (volume control knobs, temperature buttons, etc.). In these instances, the setting input module 18 recognizes the user request and generates the setting increase command or the setting decrease command that is responsive to the user's request.

The system 10 also includes the system control module 16 (e.g., a body control module, BCM), which is operatively connected to the vehicle bus 14. The system control module 16 is an electronic control unit that is capable of monitoring and controlling various accessories or systems within the vehicle 12. As such, the system control module 16 adjusts the appropriate vehicle setting in response to the setting increase command(s) and the setting decrease command(s) from the setting input module 18.

The system control module 16 includes the microprocessor 22 and its electronic memory 26. The system control module 16 also includes an input module 36. The input module 36 includes computer-readable instructions that are stored on the memory 26 and are executable by the microprocessor 22. The input module 36 receives the setting increase command(s) and the setting decrease command(s) from the setting input module 18, and translates the received command(s) into a function to be implemented by the appropriate accessory or system. The input module 36 causes the appropriate accessory or system to perform the function.

The function is increasing or decreasing the audio volume by some preset number of units, increasing or decreasing the temperature by some preset number of degrees, increasing or decreasing the speed of the windshield wipers by moving to a setting that is one above or below the then-current wiper setting (e.g., going from off to intermittent, or from continuous to intermittent, etc.), or increasing or decreasing the opening of the window by some preset distance. The preset functions may be default values installed by the manufacturer. In these instances, the increment amount for each type of input (i.e., speech, gesture, touch screen command, etc.) is calibrated to the default increment. For example, if manually turning a knob results in a 1 degree change in temperature, then the speech input, gesture input, etc. requesting a change in temperature will also result in a 1 degree change in temperature. Alternatively, the preset functions may be preferences that are set by the user. In an example, the user may be able to adjust the default values using the display 34 to access a program that enables such preferences to be selected and saved. For example, if the default function for temperature is to increase or decrease the temperature by three degrees, the user may revise and save the function so that the increase or decrease is five degrees. In this example, when the user inputs a gesture to raise the temperature, the input module 36 is programmed to translate the received command(s) into the saved function, and the HVAC will implement the function by increasing the in-vehicle temperature by five degrees.

As previously mentioned, the input module 36 causes the appropriate accessory or system to perform the function. The accessory or system used will depend upon the setting increase command(s) and the setting decrease command(s).

If the setting command relates to the volume, the accessory or system is the audio component 38. The audio component 38 is operatively connected to the vehicle bus 14 and an audio bus 46. The audio component 38 receives analog information, rendering it as sound, via the audio bus 46. Digital information is received via the vehicle bus 14. The audio component 38 provides AM and FM radio, satellite radio, CD, DVD, multimedia and other like functionality. The audio component 38 may contain a speaker system, or may utilize vehicle speaker(s) via arbitration on vehicle bus 14 and/or audio bus 46.

If the setting command relates to the temperature, the accessory or system is the heating-ventilation-air conditioning (HVAC) unit 40.

If the setting command relates to the windshield wiper speed, the accessory or system is the windshield wipers 42.

If the setting command relates to the opening/closing of a particular window, the accessory or system is the particular window 44. In the examples disclosed herein, the window 44 is a power window/electric window.

The system 10 also includes the ambient light control module 20. The ambient light control module 20 includes the microprocessor 22", which runs computer-readable instructions stored on its electronic memory 26". The ambient light control module is also operatively connected to the ambient light 48. The ambient light control module 20 is responsive to the setting input module 18 and/or the system control module 16, and the ambient light 48 is responsive to the ambient light control module 20. Generally, the ambient light control module 20 recognizes a signal from the setting input module 18 and/or the system control module 16, generates a light color control output that corresponds with the recognized signal, and transmits the light color control output to the ambient light 48, which adjusts its color accordingly.

In the examples when the ambient light control module 20 is responsive to the setting input module 18, the setting input module 18 transmits the setting increase command(s) and the setting decrease command(s) to both the system control module 16 and the ambient light control module 20. In these instances, the ambient light control module 20 receives the setting increase command(s) or the setting decrease command(s) from the setting input module 18, and identifies the color of the ambient light 48 that is associated with the received setting command. To identify the color that is associated with the setting command, the ambient light control module 20 may access a look up table (stored in the memory 22") in which the setting commands are linked with a feedback color setting or run a mapping function that maps the setting command to a feedback color setting.

In the examples when the ambient light control module 20 is responsive to the system control module 16, the ambient light control module 20 receives the setting increase command(s) and the setting decrease command(s) from the system control module 16 (rather than from the setting input module 18). Upon receiving the setting command, the ambient light control module 20 identifies the color of the ambient light 48 that is associated with the received setting command as previously described.

Once the ambient light control module 20 identifies the color that is associated with the received setting command, the ambient light control module 20 generates the light color control output. The light color control output controls the color of the ambient light 48.

It is to be understood that the ambient light control module 20 and the input module 36 of the system control module 16 are in communication with one another so that the ambient light 48 can be controlled as the vehicle setting is being adjusted. In some instances, the ambient light control module 20 may generate the light color control output as the input module 36 is generating the function. The ambient light control module 20 may be programmed to recognize or receive a signal (in addition to the setting command) from the input module 36, which indicates that the input module 36 has generated the function and that the function is to be implemented by the accessory or system. In response to recognizing or receiving this signal, the ambient light control module 20 transmits the light color control output to the ambient light 48. The ambient light 48 responds by altering its color in accordance with the light color control output. As such, the ambient light 48 changes its color as the accessory or system implements the function.

In the examples disclosed herein, since the function and color change are performed simultaneously and since the ambient light color is associated with the setting increase or decrease, the ambient light color provides visual feedback to the user that the requested setting change is being implemented.

The ambient light control module 20 may be programmed to generate several light color control outputs. The light color control output instructs the ambient light 48 to illuminate a particular color within the vehicle 12 interior or to transition toward a particular color.

One example of the light color control outputs provides a primary color setting. The primary color setting is a main or default color, not necessarily a primary color. In an example, the primary color setting is white. The light color control output providing the primary color setting may be transmitted by the ambient light control module 20 in the absence of the setting increase command and the setting decrease command. For example, when the user has not requested a change to any in-vehicle setting, the ambient light control module 20 may transmit the light color control output to the ambient light 48 with the primary color setting, and the ambient light 48 illuminates the white light (or other colored light associated with the primary color setting). In these examples, the ambient light control module 20 is responsive to the lack of communication from the setting input module 18 and the system control module 16.

Another example of the light color control outputs provides a then-current color setting. The then-current color setting is the color that is associated with the real-time setting (i.e., the current setting of the system in the vehicle 12). As such, the then-current color setting is not associated with any particular color, but will change depending upon the then-current setting in the vehicle 12. The light color control output providing the then-current color setting may be transmitted by the ambient light control module 20 in the absence of the setting increase command and the setting decrease command. As an example, if the vehicle 12 is turned on, and the user has not requested a change to the in-vehicle setting, and the in-vehicle setting is set at some value, the ambient light control module 20 may transmit the light color control output to the ambient light 48 with the then-current color setting that is representative of the set value. The ambient light 48 then illuminates the appropriate light color. The then-current color setting is dynamic as it changes with the in-vehicle setting(s).

For the then-current color setting, the color that is illuminated is linked to the current value of the setting. For example, ambient light colors may be assigned to particular temperature values. In a specific example, different shades of red light may be linked to temperatures at or above a high threshold temperature value (e.g., 75° F.), different shades of blue light may be linked to temperatures at or below a low threshold temperature value (e.g., 60° F.), and different shades of purple light may be linked to temperatures above the low threshold value and below the high threshold value.

The other light color control outputs provide different feedback colors settings. Each feedback color setting is associated with a color (or shades of a color) and an in-vehicle setting. In addition, each vehicle setting may be linked to two different feedback color settings, one feedback color setting for the increase in the setting (i.e., the setting increase command) and a different feedback color setting for the decrease in the setting (i.e., the setting decrease command). In some examples, the illumination of the ambient light color may be a binary switch, e.g., from the primary color to the feedback color. In other examples, the illumination of the ambient light color may be a transition from one color to another color. During this transition, the ambient light 48 traverses a gradient spectrum of color (i.e., two colors and several iterations of color between the two colors). In general, the gradient spectrum of color will include any blend of the two feedback colors associated with the particular setting. For example, the two feedback colors may be red and blue, and the gradient spectrum may include various shades of purple. For another example, the two feedback colors may be green and yellow, and the gradient spectrum may include various shades of light green.

The correspondence of each setting with two different feedback color settings allows the in-vehicle user to identify how the setting that is being altered as a result of the change in the in-vehicle ambient lighting. As an example, the temperature setting may be linked to red as the feedback color for any increase in temperature and to blue as the feedback color for any decrease in temperature. As another example, the volume setting may be linked to yellow as the feedback color for any decrease in volume and to green as the feedback color for any increase in volume. The ability to transition between the two different feedback color settings allows the in-vehicle user to identify the degree to which the setting that is being altered as a result of the gradient spectrum of color.

The colors that are available as feedback colors may depend upon the ambient light 48. When a RGB LED light is used, any primary, secondary, or blend of colors may be used as feedback colors or colors that are illuminated when transitioning between the then-current color and the feedback color. When colored bulbs are used, the colors that are available will be those of the bulbs that are included.

The ambient light control module 20 may be programmed to provide other light color control outputs that result in differential lighting, just as blinking lights, some blinking lights and some solid lights, etc. As an example, if the driver side window is being adjusted, any ambient light(s) 48 on the driver's side may blink while any ambient light(s) 48 on the passenger's side may be solid. The differential lighting may also be altered as the vehicle setting is increasing or decreasing. For example, the ambient light 48 may blink faster as the vehicle setting is increasing, or blink slower as the vehicle setting is decreasing. In another example, when the change in color is a binary switch from the primary color setting to the feedback color setting, the ambient light 48 may transition to red, and then blink when the requested change has been completed. It is to be understood that any variation in differential lighting may be used that will inform the in-vehicle user(s) that the requested setting change is being made or has been made.

The ambient light control module 20 may also be programmed to adjust the brightness of the ambient light 48 as the vehicle setting is increasing or decreasing. For example, the brightness of the ambient light 48 may incrementally increase as the vehicle setting continues to increase or decrease. The change in brightness as well as color may further aid in providing visual feedback to the user.

The feedback color settings may be default colors that are linked to the increase and the decrease of the in-vehicle setting, or the user may program the feedback color settings in the ambient light control module 20. In an example, the user may be able to adjust the default colors using the display 34 to access a program that enables such preferences to be selected and saved. For example, if the default feedback colors for temperature increase and decrease are red and blue, respectively, the user may revise and save the feedback colors for temperature increase and decrease to be orange and purple, respectively. In this example, when the user inputs a gesture to raise the temperature, the input module 36 is programmed to increase the temperature as the ambient light 48 illuminates orange light. The user may also input preferences with regard to the use of differential lighting or an increase in brightness.

At some time after the vehicle setting has been adjusted to the increased setting value or the decreased setting value, the ambient light control module 20 may be programmed to return the ambient light 48 to the primary color setting. In these examples, the ambient light control module 20 may be programmed to recognize or receive yet another signal from the input module 36, which indicates that the accessory or system has completed the adjustment of the vehicle setting. Upon recognizing or receiving this signal, the ambient light control module 20 may delay for some preset time period before transmitting the light color control output that provides the primary color setting. In response, the ambient light 48 returns to the primary color setting.

In other examples, after the vehicle setting has been adjusted to the increased setting value or the decreased setting value, the ambient light control module 20 may be programmed to maintain the ambient light 48 at the new then-current color. The new then-current color is the color that is associated with updated setting. The ambient light control module 20 may be programmed to recognize or receive yet another signal from the input module 36, which indicates that the accessory or system has completed the adjustment of the vehicle setting. Upon recognizing or receiving this signal, the ambient light control module 20 may transmit the light color control output that instructs the ambient light 48 to maintain the new then-current color. In response, the ambient light 48 maintains the updated then-current color setting until another user input is received requesting an increase or decrease in the same or a different in-vehicle setting or until the ambient light 48 is turned off. After being turned off, the ambient light 48 may default to the primary color setting or may be programmed to receive a light color control output that is indicative of a then-current setting when the vehicle 12 is powered back on.

As also shown in FIG. 1, the vehicle 12 may include a vehicle communications platform (VCP) 50. In one example, the VCP 50 is an on-board vehicle dedicated communications and entertainment device. In another example (not shown), the VCP 50 is an on-board vehicle dedicated communications device (e.g., a telematics unit) that is in operative communication with a separate on-board vehicle dedicated entertainment device. Whether integrated into a single unit or included as separate units, the on-board vehicle dedicated communications and entertainment device(s) include hardware components that are capable of running computer readable instructions/code, which are embodied on non-transitory, tangible computer readable media.

The VCP 50 may be used for vehicle communications. In some instances, vehicle communications are enabled through the VCP 50 via a communications module, which includes a cellular chipset/component for voice communications and a data transmission system for data (e.g., rich message or data package) transmission. The data transmission system may include any hardware component(s) and software that equip the vehicle 12 with an Internet connection, such as a 4G LTE connection. In another example, the data transmission system may include a wireless modem, which applies some type of encoding or modulation to convert the digital data so that it can communicate through a vocoder or speech codec incorporated in the cellular chipset/component. It is to be understood that any suitable encoding or modulation technique that provides an acceptable data rate and bit error may be used with the examples disclosed herein. While examples have been provided, it is to be understood that any suitable data transmission system may be used.

In the examples disclosed herein, the data transmission system of the VCP 50 may be used to download any updates to the computer readable instructions of the ambient light control module and/or to receive user preferences with regard to in-vehicle settings from a vehicle-related website.

Figure 2:
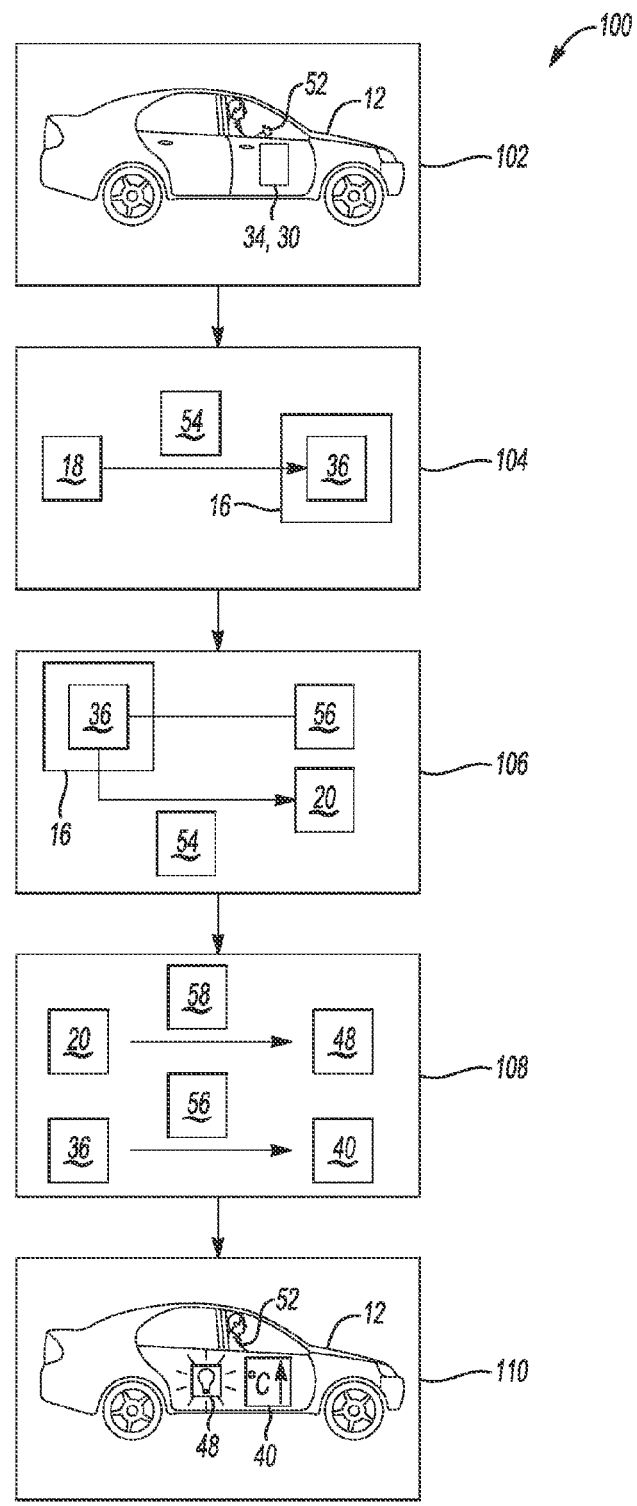
FIG. 2 is an example of a method for vehicle setting control.

Referring now to FIG. 2, one example of the method 100 using the system 10 for vehicle setting control is depicted. As shown at box 102, the user 52 in the vehicle 12 requests an increase in the temperature by gesturing a thumb's up in front of the screen of the display 34 (i.e., part of the gesture zone). The gesture recognition unit 30 identifies the gesture and matches the identified gesture with the requested temperature increase (e.g., through a look up table).

The setting input module 18 (through microprocessor 22' running computer readable instructions/code) then generates the temperature increase command 54 that is responsive to the user's request, and transmits the temperature increase command 54 to the input module 36 of the system control module 16, as shown at box 104.

The input module 36 receives the temperature increase command 54. In this example, the input module 36 then performs multiples tasks (shown in box 106). The input module 36 translates the received command 54 into a function 56 to be implemented by the HVAC unit 40. The input module 36 also passes the temperature increase command 54 on to the ambient light control module 20. While the input module 36 translates the received command 54 into the function 56, the ambient light control module 20 uses the command 54 and a look up table to determine which feedback color setting should be used when the temperature is adjusted. The ambient light control module 20 also generates an appropriate light color control output that will instruct the ambient light 48 to light up in accordance with the identified feedback color setting.

When the function 56 is generated, the input module 36 will send a signal to the ambient light module 20 to begin the ambient light change. As shown at box 108, the ambient light control module 20 transmits the light color control output 58 to the ambient light 48 while the input module 36 causes the HVAC unit 40 to implement the function. As such, as shown in box 110, while the HVAC unit 40 raises the temperature, the ambient light 48 is illuminated red or transitions to red, or is illuminated or transitioned to some other color that is preset for the temperature increase command 54. This visually informs the user 52 that his/her request is being implemented.

While not shown in FIG. 2, it is to be understood that after the temperature is reached and after a delay in time has passed, the ambient light control module 20 transmits another light color control output providing that the ambient light 48 should return to its primary color state.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for vehicle setting control, the method comprising:
receiving an input to increase or decrease a setting of a system in a vehicle interior;
adjusting the setting in response to the input;
controlling an in-vehicle ambient light color during the adjusting, wherein an ambient light changes from a primary color setting to a first feedback color during an increase of the setting and to a second feedback color during a decrease of the setting; and
returning the in-vehicle ambient light color to the primary color setting at a time after completing the adjusting.

2. The method as defined in claim 1 wherein a predetermined delay occurs after completing the adjusting and prior to the returning.

3. The method as defined in claim 1 wherein the ambient light is selected from the group consisting of an in-vehicle light strip dedicated for in-vehicle ambient lighting, an overhead interior light, a dashboard light, a floor light, a console light, and combinations thereof.

4. The method as defined in claim 1 wherein the ambient light is not a display graphic or a light of a system control input.

5. The method as defined in claim 1 wherein:
the setting is a heating-ventilation-air conditioning temperature;
the first feedback color is red; and
the second feedback color is blue.

6. The method as defined in claim 5, further comprising incrementally increasing a brightness of the second feedback color as the heating-ventilation-air conditioning temperature is decreased.

7. The method as defined in claim 5, further comprising incrementally increasing a brightness of the first feedback color as the heating-ventilation-air conditioning temperature is increased.

8. The method as defined in claim 1, further comprising:
receiving user input associating the setting with the first feedback color and the second feedback color; and
saving the user input.

9. The method as defined in claim 1, further comprising using differential lighting during the controlling of the in-vehicle ambient light color.

10. A system for controlling a vehicle setting, comprising:
a system control module to provide settings in a vehicle interior, the system control module including an input module responsive to a setting increase command and a setting decrease command;
a setting input module to provide the setting increase command and the setting decrease command;
an ambient light control module responsive to one of the setting input module and the system control module with light color control outputs providing at least:
i) a primary color setting responsive to an absence of the setting increase command and the setting decrease command;
a first feedback color setting responsive to the setting increase command; and
a second feedback color setting responsive to the setting decrease command; or
ii) a color setting indicative of a then-current setting;
a first feedback color setting responsive to the setting increase command; and
a second feedback color setting responsive to the setting decrease command; and
an ambient light in the vehicle interior having color controllable in response to the ambient light control module.

11. The system as defined in claim 10, further comprising:
a vehicle bus operatively connected to the system control module and the setting input module; and
a gesture recognition unit as a component of the setting input module.

12. The system as defined in claim 10 wherein the ambient light control module is operatively connected to a microprocessor and includes computer-readable instructions, embodied on a non-transitory, tangible computer-readable medium and executable by the microprocessor, the computer-readable instructions to:
recognize a signal from the setting input module or the system control module;
generate one of the light color control outputs that corresponds with the recognized signal; and
transmit the generated one of the light color control outputs to the ambient light.

13. The system as defined in claim 12 wherein the ambient light control module further includes computer-readable instructions to:
   incrementally increase a brightness of the second feedback color as the vehicle setting is decreased; and
   incrementally increase a brightness of the first feedback color as the vehicle setting is increased.

14. The system as defined in claim 10 wherein the ambient light is selected from the group consisting of an in-vehicle light strip dedicated for in-vehicle ambient lighting, an overhead interior light, a dashboard light, a floor light, a console light, and combinations thereof.

15. The system as defined in claim 10 wherein:
   the vehicle setting is a heating-ventilation-air conditioning temperature;
   the first feedback color is red; and
   the second feedback color is blue.

16. The system as defined in claim 10 wherein the ambient light is to traverse a gradient spectrum of color as it transitions from the then-current color setting towards the first feedback color or towards the second feedback color.

17. A method for vehicle setting control, the method comprising:
   receiving an input to increase or decrease a setting of a system in a vehicle interior;
   adjusting the setting in response to the input;
   controlling an in-vehicle ambient light color during the adjusting, wherein an ambient light transitions from a then-current color setting towards a first feedback color during an increase of the setting and towards a second feedback color during a decrease of the setting; and
   upon reaching an increased setting value or a decreased setting value, remaining at a new then-current color until an other input to increase or decrease the setting of the system is received or until the ambient light is turned off.

18. The method as defined in claim 17 wherein as the ambient light transitions from the then-current color setting towards the first feedback color or towards the second feedback color, the ambient light traverses a gradient spectrum of color.

19. The method as defined in claim 18 wherein:
   the first feedback color is red or green;
   the second feedback color is blue or yellow; and
   the gradient spectrum of color includes at least one shade of purple, orange, green-blue, or light green.

20. The method as defined in claim 17, further comprising any of:
   incrementally increasing a brightness of the ambient light as the setting is increased or decreased; or
   using differential lighting during the controlling of the in-vehicle ambient light color.

\* \* \* \* \*